(12) United States Patent
Monneau

(10) Patent No.: US 6,505,697 B2
(45) Date of Patent: Jan. 14, 2003

(54) SUSPENSION FITTING FOR A MOTOR VEHICLE EXHAUST SYSTEM, AND A VEHICLE FITTED THEREWITH

(75) Inventor: Jean-Pierre Monneau, Douy (FR)

(73) Assignee: Hutchinson, Paris (FR)

( * ) Notice: Subject to any disclaimer, the term of this patent is extended or adjusted under 35 U.S.C. 154(b) by 29 days.

(21) Appl. No.: 09/899,051

(22) Filed: Jul. 5, 2001

(65) Prior Publication Data

US 2002/0014362 A1 Feb. 7, 2002

(30) Foreign Application Priority Data

Jul. 10, 2000 (FR) .............................. 00 08972

(51) Int. Cl.⁷ .............................................. B60K 13/04
(52) U.S. Cl. ................... 180/89.2; 248/634; 248/60; 180/296
(58) Field of Search .................. 180/89.2, 296; 248/60, 612, 634

(56) References Cited

U.S. PATENT DOCUMENTS

| | | | | |
|---|---|---|---|---|
| 4,116,411 A | * | 9/1978 | Masuda | 180/89.2 |
| 4,676,332 A | * | 6/1987 | Saito | 180/219 |
| 4,893,778 A | * | 1/1990 | Drabing et al. | 248/60 |

FOREIGN PATENT DOCUMENTS

| | | |
|---|---|---|
| DE | 195 00 191 | 3/1996 |
| EP | 0 945 297 | 9/1999 |
| EP | 0 979 930 | 2/2000 |
| FR | 2 761 730 | 10/1998 |

OTHER PUBLICATIONS

Search Report issued by the French Patent Office for parent French Application No. 00 08972 filed on Jul. 10, 2000; report dated Apr. 24, 2001.

* cited by examiner

Primary Examiner—Paul N. Dickson
Assistant Examiner—Faye M. Fleming
(74) Attorney, Agent, or Firm—Marshall, Gerstein & Borun

(57) ABSTRACT

A suspension fitting for a motor vehicle exhaust system, the fitting comprising a top and bottom strength members interconnected by a resilient system comprising firstly a single central support arm and secondly a flexible limiting ring surrounding the support arm to limit relative travel between the strength members in a direction corresponding to the support arm lengthening. The top and bottom strength members have respective downwardly and upwardly extending rigid limbs which are placed facing each other on a horizontal axis perpendicular to the general direction of the exhaust system so as to come into abutment against each other and limit relative travel between the strength members along the axis.

10 Claims, 3 Drawing Sheets

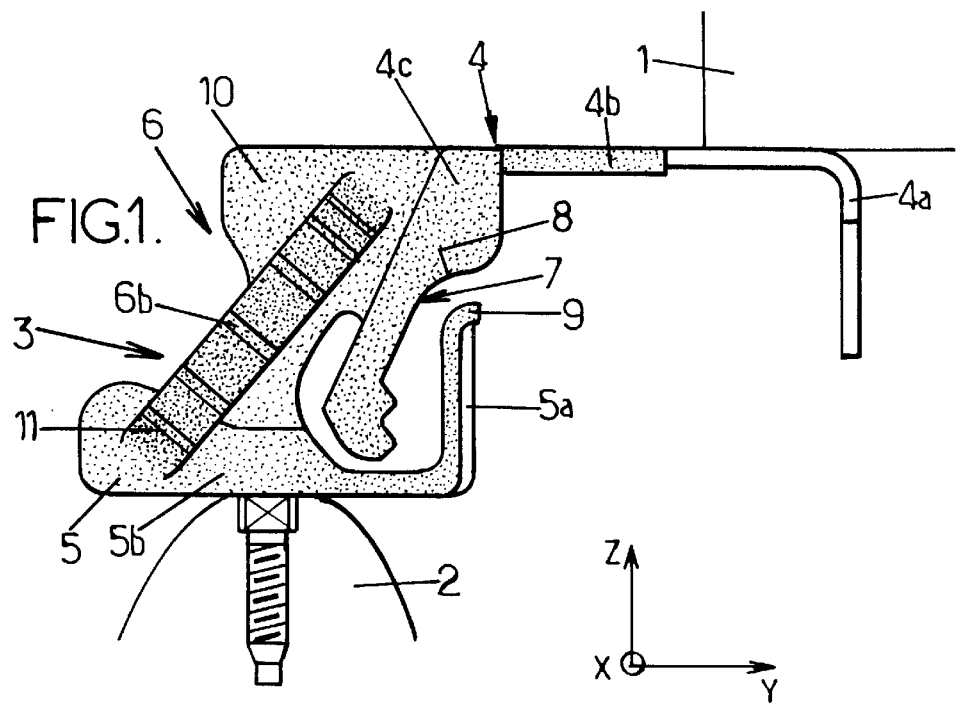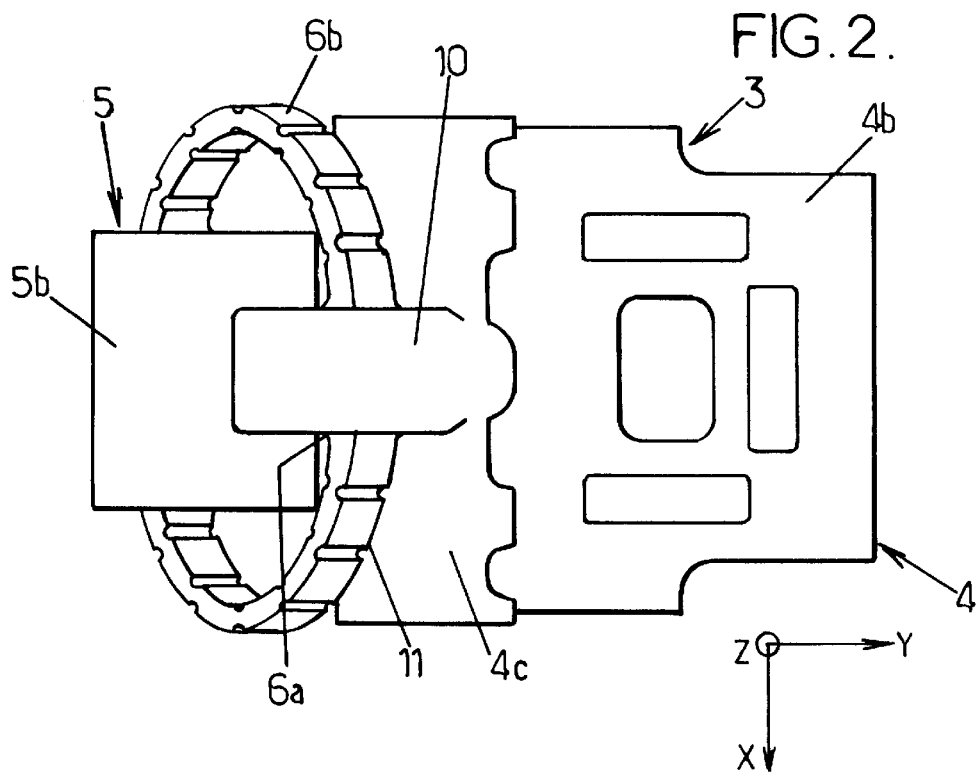

SUSPENSION FITTING FOR A MOTOR VEHICLE EXHAUST SYSTEM, AND A VEHICLE FITTED THEREWITH

FIELD OF THE INVENTION

The present invention relates to suspension fittings for motor vehicle exhaust systems, and to vehicles fitted therewith.

More particularly, the invention relates to a suspension fitting for a motor vehicle exhaust system, the fitting comprising a rigid top strength member suitable for being secured to the bodywork of the vehicle and a rigid bottom strength member suitable for being secured to an exhaust system which extends longitudinally in a general direction parallel to a first axis, these two strength members being connected to each other by a resilient unit made of elastomer and comprising:

firstly a central support arm adapted to support traction forces along a second axis and to filter and damp relative vibratory motion between the top and bottom strength members, said support arm being disposed perpendicularly to the first axis and extending at an angle between a top secured to the top strength member and a bottom secured to the bottom strength member, said angle being relative to the second axis and relative to a third axis that is perpendicular to the first and second axes, the support arm extending in a first direction along the third axis from its top to its bottom; and secondly a flexible limiting ring surrounding the support arm and connected to the two strength members to limit relative travel of said strength members in a direction corresponding to the support arm lengthening.

BACKGROUND OF THE INVENTION

A suspension fitting of this type is known, in particular from document FR-A-2 761 730. It gives general satisfaction from the functional point of view, but it is expensive to make because of its complexity.

OBJECTS AND SUMMARY OF THE INVENTION

The present invention seeks in particular to mitigate this drawback of prior art suspension fittings, by proposing a fitting which reconciles all operating requirements, and which can be manufactured simply and at lower cost.

To this end, the suspension fitting of the invention comprises only a single support arm and the top and bottom strength members include respective rigid limbs placed facing each other along the third axis so as to come into abutment against each other to limit relative travel of the bottom strength member relative to the top strength member along the third axis in a second direction opposite to the first direction.

By means of these dispositions, because of a presence of a single support arm and the presence of abutments of simple design, a fitting is obtained that is of low cost, presenting excellent characteristics in filtering vibration, in particular because of relatively low stiffness along the third axis, while conserving effective limitation of travel along said third axis.

This suspension fitting is particularly effective when it is used in pairs mounted in opposition.

In advantageous embodiments, use can be made of one or more of the following dispositions:

the limbs of the two strength members correspond mutually over a certain overlap width greater than 2 centimeters (cm) measured along the first axis, and said limbs are disposed so that said overlap width is still at least 2 cm after relative displacement through 1 cm along the first axis;

the limb of the bottom strength member is of a width along the first axis that is less than the width of the limb of the top strength member along the first axis;

the limbs of the top and bottom strength members are covered in a layer of elastomer that is integral with the elastomer of the support arm and of the limiting ring;

the respective limbs of the strength members come into abutment against respective horizontal portions of the other strength members in a direction corresponding to the support arm being compressed along the second axis;

the limb of the top strength member comes into abutment against the bottom of the support arm in the first direction along the third axis;

the flexible limiting ring is adapted to enter into resonance at a frequency lying in the range 250 hertz (Hz) to 350 Hz to diminish the dynamic stiffness of the fitting in the vicinity of said frequency; and the flexible limiting ring is provided on its peripheral surface with a plurality of notches.

In another aspect of the invention, it provides a vehicle having bodywork and an exhaust system connected to the bodywork via at least one suspension fitting as defined above.

Advantageously, the exhaust system is connected to the bodywork via at least two fittings mounted in opposition, the respective flexible rings thereof being disposed in two sloping planes that converge downwardly towards each other.

BRIEF DESCRIPTION OF THE DRAWINGS

Other characteristics and advantages of the invention appear from the following description made with reference to the accompanying drawings which show an embodiment that is not limiting in any way.

In the drawings:

FIG. 1 is an axial elevation view of a suspension fitting constituting an embodiment of the invention;

FIG. 2 is a plan view of the FIG. 1 fitting;

MORE DETAILED DESCRIPTION

In the various figures, the orientation of the suspension fitting in three dimensions is identified by three mutually perpendicular axes: Z for the vertical direction, Y for the horizontal transverse direction, and X for the horizontal axial direction (i.e. along the axis of the vehicle, substantially colinear with the general axis of the exhaust system).

Figure 4:
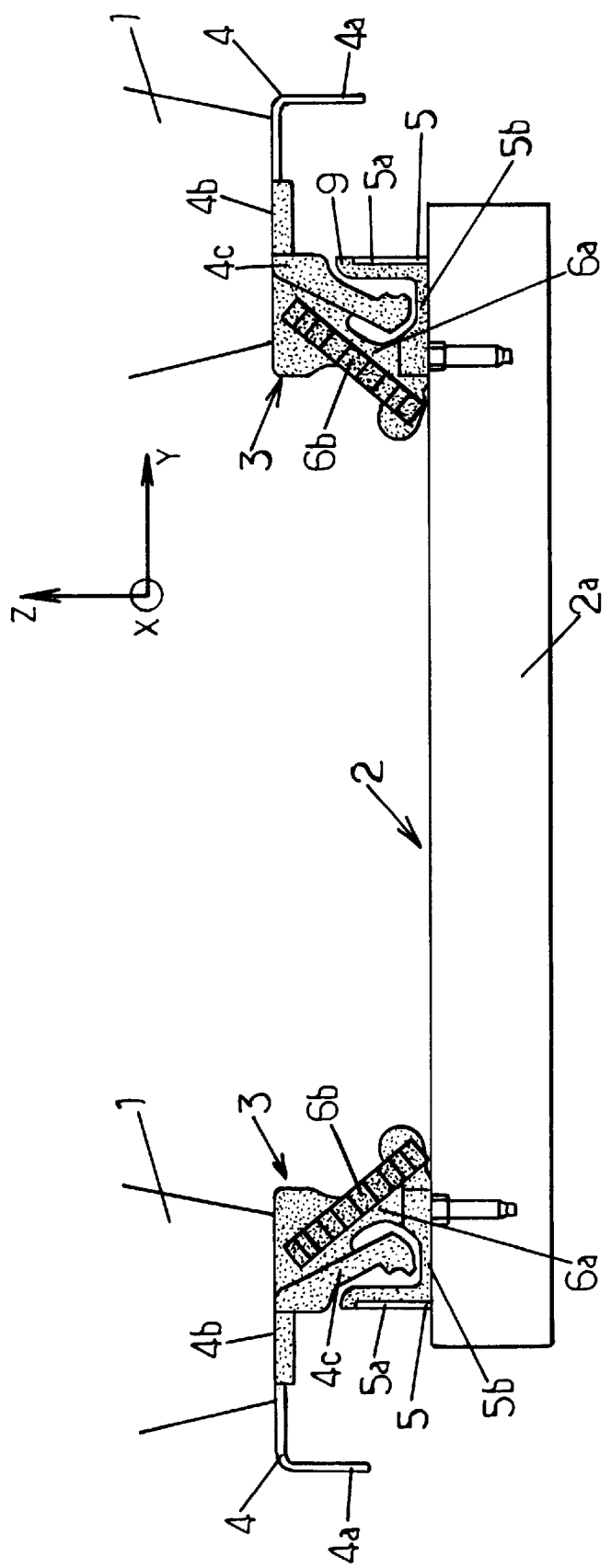
FIG. 4 is a front view showing an exhaust system mounted on a vehicle by means of two suspension fittings mounted in opposition.

In FIGS. 1, 2, and 4, reference 1 designates the bodywork of the vehicle (and can be constituted in particular by its side members or rails), reference 2 designates the exhaust system (in the vicinity of its silencer or muffler), and reference 3 designates the suspension fitting connecting the exhaust system to the bodywork of the vehicle.

The fitting 3 is constituted:
by a top strength member 4 for connection to the bodywork of the vehicle 1;
by a bottom strength member 5 for connection to the exhaust 2; and
by a resilient elastomer unit 6 interconnecting the two strength members 4 and 5.

The top strength member 4 is obtained by folding or stamping metal sheet material, and comprises a first bracket for bolting to the bodywork of the vehicle 1. The connection with the bodywork of the vehicle can be performed by means of an orifice, slots, or the like formed in one of the limbs 4b of the bracket 4, said orifice serving to pass a first fastener for connection with the bodywork.

This bracket comprises a top horizontal limb 4b which is extended downwards by two side limbs 4a and 4c. In addition, at least one of the limbs 4c is at an angle of more than 90° relative to the limb 4b contiguous therewith.

The limb 4c extends substantially parallel in the plane defined by the second axis Z and the third axis Y, and perpendicular to the first axis X. The limb 4a lies in a plane parallel to the plane defined by the axes X, Z and perpendicular to the third axis Y.

According to another characteristic of the invention, the sloping limb 4c of the top strength member 4 is covered in an overmolded layer of elastomer which includes an empty zone 8 in the vicinity of its horizontal inside face 7 (i.e. its face which faces towards the exhaust 2 when the fitting is mounted on a vehicle).

This empty zone 8 is positioned substantially facing a limb 5a belonging to the bottom strength member 5.

The bottom strength member 5 which is likewise obtained by folding or stamping metal sheet material comprises a second bracket suitable for being bolted to the exhaust 2 of the vehicle. This second bracket is substantially L-shaped and comprises a bottom horizontal limb 5b extended upwards by a side limb 5a. The limb 5b is positioned substantially in a horizontal plane defined by the first and third axes X and Y respectively while the limb 5a is perpendicular to said plane and extends vertically along the second axis Z. The limb 5b has a second fastener for connection to the exhaust. As shown in FIGS. 1 and 4, it can be constituted by a threaded pin or the like.

It can also be observed that the limb 5a facing the limb 4c of the top strength member 4 in the vicinity of the empty zone 8 in the elastomer carries an elastomer pad 9 at one of its ends, said pad 9 coming into abutment in the horizontal empty zone 8 when the top and bottom strength members 4 and 5 reach their relative travel limit in compression along the Z axis.

In a manner similar to the top strength member 4, the bracket forming the bottom strength member 5 is coated in an elastomer layer, in particular on the top face of the limb 5b and on the face of the limb 5a which faces towards the limb 4c.

Furthermore, the top strength member 4 has a projecting portion 10 which extends substantially in the same plane as the top face 4b of the strength member 4, and which has a central support arm 6a overmolded and bonded thereon, which arm is made of elastomer that forms part of the resilient unit 6.

The single support arm 6a is disposed perpendicularly to the first axis X and it extends at an angle along the second axis Z and along the third axis Y between the top 10 secured to the strength member 4 and a bottom which is bonded to the top face of the limb 5b of the bottom strength member 5.

More precisely, the support arm 6a extends in a first direction along the axis Y from its top towards its bottom. It supports the weight of the exhaust system and damps and filters vibration between said exhaust system 2 and the bodywork 1 of the vehicle, with relatively low stiffness along the axes Y and Z.

This central support arm 6a is also inserted through a limiting ring 6b which is coplanar with said support arm 6a and which is generally made by coating a flexible and inextensible annular core in elastomer.

This ring 6b also connects the top strength member 4 to the bottom strength member 5, and constitutes a second element of the resilient unit 6.

This unit is assembled to the strength members so as to form the suspension fitting. Given its shape, in particular the fact that the support arm 6a and the ring 6b lie in the same plane and that there is only support arm 6a, all of the elastomer portions of the fitting can be molded as a single piece, in a single molding operation.

The limiting ring 6b is connected to the two strength members 4 and 5 in order to limit relative travel between said strength members in a direction corresponding to the support arm 6a being lengthened.

This limiting ring 6b is flexible and it is adapted to enter into resonance at a frequency lying substantially in the range 250 Hz to 350 Hz in order to reduce the dynamic stiffness of the suspension fitting in the vicinity of said frequency by a "beater" effect.

Figure 3:
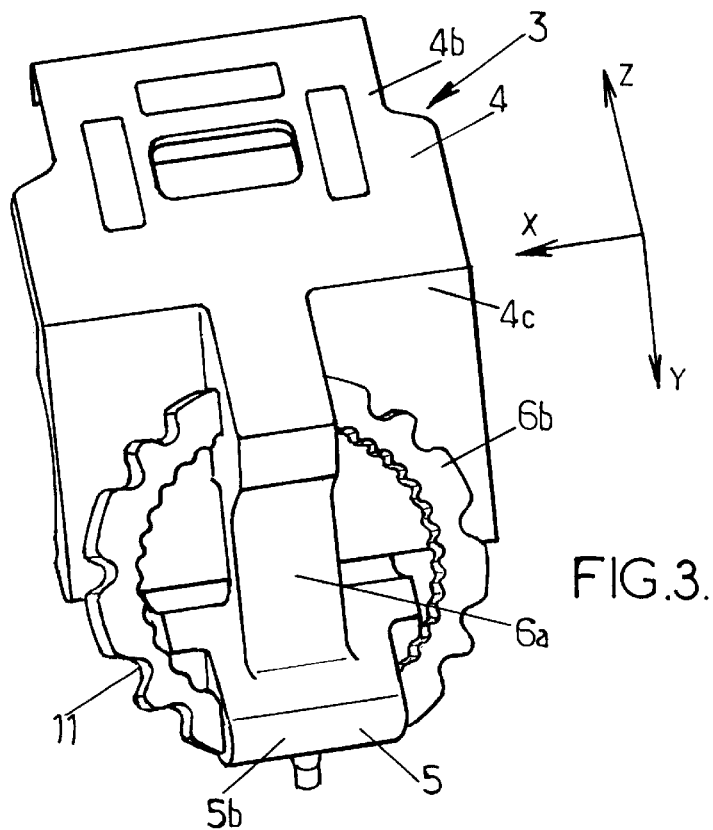
FIG. 3 is a perspective view of the fitting of FIGS. 1 and 2.
Figure 5:
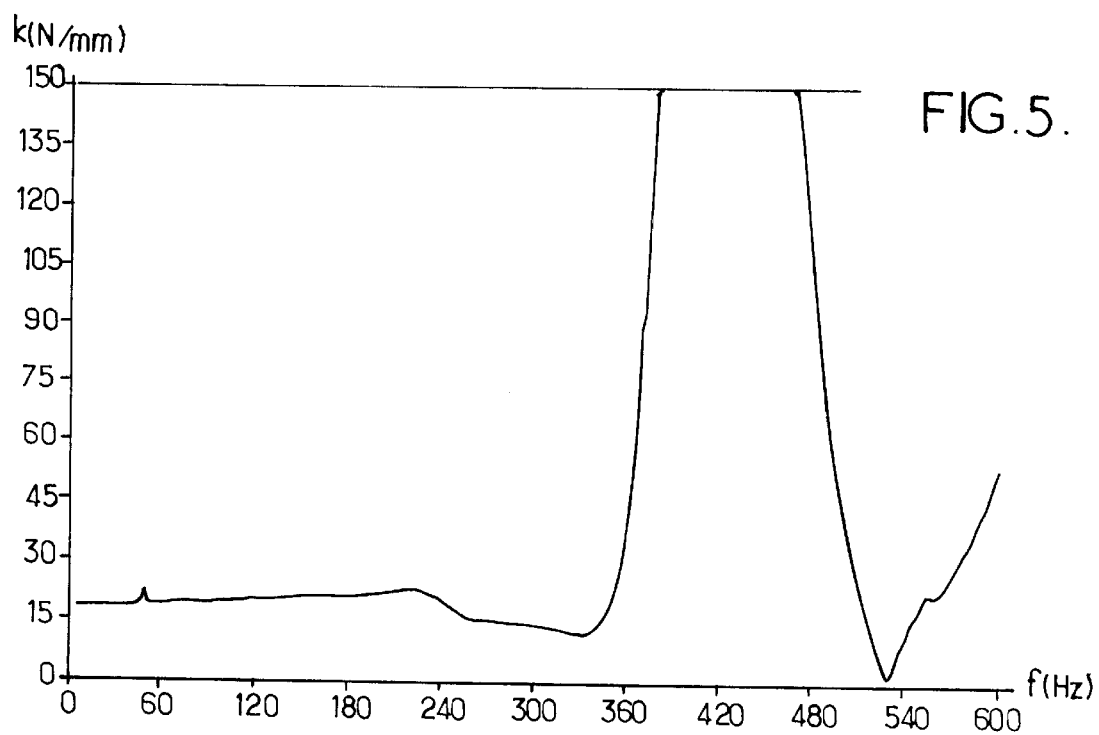
FIG. 5 is a graph showing how the dynamic stiffness in the vertical direction of the suspension fitting of FIGS. 1 to 3 varies as a function of frequency.

This phenomenon is explained with reference to FIG. 5 in which it can be seen that for frequencies f in the range 250 Hz to 350 Hz, stiffness k drops by about 10 Newtons per millimeter (N/mm) before rising.

In order to enhance bending of the flexible ring 6b, the ring is provided on its peripheral surface with a plurality of notches 11.

According to another characteristic of the invention, the top and bottom strength members 4 and 5 are mounted in such a manner that the bottom strength member 5 is offset sideways along the axis Y relative to the top strength member 4. The central support arm 6a is thus positioned substantially in a plane parallel to the limb 4c of the top strength member and co-operates with the limb 5a of the bottom strength member 5 to define a gap. In this gap, the limb 4c can move along the axes X, Y, and Z, but with amplitude along the axes Y and Z being limited as follows:

when the limb 4c bottoms against the limb 5b of the bottom strength member along the axis Z and/or the limb 5a bottoms against the layer of elastomer covering the limb 4c of the top strength member 4 along the axis Z;

when the limbs 4a and 5c come into abutment against each other along the axis Y in a second direction opposite to the first direction; and when the limb 4c of the top strength member 4 comes into abutment against the bottom of the support arm 6a in the first direction along the axis Y (when the fitting is associated with a second fitting mounted in opposition, as described in greater detail below with reference to FIG. 4, travel in this direction is also limited by abutment between the limbs 5a and 4c of the second fitting).

These limits introduced by abutments for the amplitude of relative movements between the two strength members define the extreme amounts of deformation that need to be accommodated by the elastomer unit and in particular by the coating layers 6a and 6b, thus ensuring long life for the suspension fitting.

In this configuration where the bottom strength member 5 is offset laterally relative to the top strength member 4, this also makes it possible to position the limiting ring 6b in a plane that slopes relative to the vehicle.

According to yet another characteristic of the invention, the strength member secured to the vehicle bodywork (in this case the strength member 4) is much longer along the X axis than is the strength member which co-operates with the exhaust.

In particular, in the example shown in FIG. 2, the limb 4c of the top strength member 4 is much longer (in the X axis direction) than is the limb 5a of the bottom strength member 5.

This disposition enables the two strength members to remain permanently facing each other so as to guarantee limitation along the Y axis, regardless of the amount of thermal expansion to which the exhaust system might be subject along the X axis.

To this end, the limbs 4c and 5a of the two strength members 4 and 5 can advantageously be in mutual correspondence over an overlap width of more than 2 cm measured along the first axis X, and said limbs are disposed so that said overlap width continues to be not less than 2 cm even after relative displacement through 1 cm along the first axis X.

As shown in FIG. 4, the suspension fitting is designed to be mounted in opposition with an identical fitting. The top strength members 4 of the two fittings 3 mounted in opposition can be fixed, for example, to the right and left side members of the bodywork of the vehicle, while the bottom strength members 5 of the two fittings can be fixed to a rigid member 2a belonging to the exhaust system, or they can be fixed rigidly to said exhaust system, the rigid member 2a in question possibly being constituted in particular by the silencer of the exhaust system.

The limiting rings 6b of the two fittings 3 can be disposed facing each other in downwardly converging planes, while the limbs 5a of the two fittings are disposed facing away from each other.

With such a mount in opposition, the limbs 4c and 5a of one of the fittings co-operate by mutual abutment to limit travel of the exhaust system in a first direction along the y axis, while the limbs 4c and 5a of the other fitting co-operate by mutual abutment to limit travel of the exhaust system in the other direction along the y axis.

What is claimed is:

1. A suspension fitting for a motor vehicle exhaust system, the fitting comprising a rigid top strength member suitable for being secured to the bodywork of the vehicle and a rigid bottom strength member suitable for being secured to an exhaust system which extends longitudinally in a general direction parallel to a first axis, these two strength members being connected to each other by a resilient unit made of elastomer and comprising:

firstly a central support arm adapted to support traction forces along a second axis and to filter and damp relative vibratory motion between the top and bottom strength members, said support arm being disposed perpendicularly to the first axis and extending at an angle between a top secured to the top strength member and a bottom secured to the bottom strength member, said angle being relative to the second axis and relative to a third axis that is perpendicular to the first and second axes, the support arm extending in a first direction along the third axis from its top to its bottom; and secondly a flexible limiting ring surrounding the support arm and connected to the two strength members to limit relative travel of said strength members in a direction corresponding to the support arm lengthening;

the fitting comprising only a single support arm and the top and bottom strength members including respective rigid limbs placed facing each other along the third axis so as to come into abutment against each other to limit relative travel of the bottom strength member relative to the top strength member along the third axis in a second direction opposite to the first direction.

2. A fitting according to claim 1, in which the limbs of the two strength members correspond mutually over a certain overlap width greater than 2 cm measured along the first axis, and said limbs are disposed so that said overlap width is still at least 2 cm after relative displacement through 1 cm along the first axis.

3. A fitting according to claim 1, in which the limb of the bottom strength member is of a width along the first axis that is less than the width of the limb of the top strength member along the first axis.

4. A fitting according to claim 1, in which the limbs of the top and bottom strength members are covered in a layer of elastomer that is integral with the elastomer of the support arm and of the limiting ring.

5. A fitting according to claim 1, in which the respective limbs of the strength members come into abutment against respective horizontal portions of the other strength members in a direction corresponding to the support arm being compressed along the second axis.

6. A fitting according to claim 1, in which the limb of the top strength member comes into abutment against the bottom of the support arm in the first direction along the third axis.

7. A fitting according to claim 1, in which the flexible limiting ring is adapted to enter into resonance at a frequency lying in the range 250 Hz to 350 Hz to diminish the dynamic stiffness of the fitting in the vicinity of said frequency.

8. A fitting according to claim 1, in which the flexible limiting ring is provided on its peripheral surface with a plurality of notches.

9. A vehicle comprising bodywork and an exhaust system connected to the bodywork via at least one suspension fitting according to claim 1.

10. A vehicle according to claim 9, in which the exhaust system is connected to the bodywork via at least two fittings mounted in opposition, the respective flexible rings thereof being disposed in two sloping planes that converge downwardly towards each other.

* * * * *